United States Patent
Hung et al.

(10) Patent No.: US 12,555,687 B2
(45) Date of Patent: Feb. 17, 2026

(54) METHOD FOR IDENTIFYING AND TREATING HEART FAILURE WITH PRESERVED EJECTION FRACTION

(71) Applicant: MacKay Memorial Hospital, Taipei (TW)

(72) Inventors: Chung-Lieh Hung, Taipei (TW);
Yu-An Chiou, Taipei (TW);
Shien-Fong Lin, Taipei (TW)

(73) Assignee: MACKAY MEMORIAL HOSPITAL, Taipei (TW)

( * ) Notice: Subject to any disclaimer, the term of this patent is extended or adjusted under 35 U.S.C. 154(b) by 161 days.

(21) Appl. No.: 18/493,978

(22) Filed: Oct. 25, 2023

(65) Prior Publication Data
US 2025/0140422 A1    May 1, 2025

(51) Int. Cl.
*G16H 50/50* (2018.01)
*G06N 3/0464* (2023.01)
*G06T 7/00* (2017.01)
*G06T 7/11* (2017.01)
*G16H 50/20* (2018.01)

(52) U.S. Cl.
CPC ........... *G16H 50/50* (2018.01); *G06N 3/0464* (2023.01); *G06T 7/0012* (2013.01); *G06T 7/11* (2017.01); *G16H 50/20* (2018.01); *G06T 2207/30048* (2013.01)

(58) Field of Classification Search
None
See application file for complete search history.

(56) References Cited

U.S. PATENT DOCUMENTS

| | | | |
|---|---|---|---|
| 2019/0080453 A1* | 3/2019 | Song | G06T 7/73 |
| 2019/0167638 A1* | 6/2019 | Rajasekhar | A61K 31/4015 |
| 2021/0019889 A1* | 1/2021 | Novikov | G06N 3/04 |
| 2021/0259664 A1* | 8/2021 | Hare, II et al. | G06N 3/047 |
| 2022/0015711 A1* | 1/2022 | Kalidas | G06N 3/084 |
| 2023/0233089 A1* | 7/2023 | Bridges | G16H 40/67 600/301 |
| 2023/0289595 A1* | 9/2023 | Khosousi | G16H 50/70 |

OTHER PUBLICATIONS

Akerman et al. ("Automated echocardiographic detection of heart failure with preserved ejection fraction using artificial intelligence." JACC: Advances 2.6 (2023): 100452) (Year: 2023).*

* cited by examiner

*Primary Examiner* — Christopher B Tokarczyk
(74) *Attorney, Agent, or Firm* — MUNCY, GEISSLER, OLDS & LOWE, P.C.

(57) ABSTRACT

Disclosed herein is an AI-assisted screening method and model that capable of automatically extracting prominent intrabeat dynamic patterns associated with HFpEF from apical 4-chamber (A4C) view images. The method comprises steps of: (a) segmenting the plurality of A4C view images to produce a plurality of segmented images; (b) extracting a plurality of features from each segmented A4C view images of step (a) to produce a plurality of linear waveforms; and (c) training the plurality of linear waveforms of step (b) with the diagnosis of the subjects, thereby establishing the model. Also herein is a method for identifying and treating a subject having HFpEF by providing a medicament to the subject having HFpEF identified by the present model.

11 Claims, 1 Drawing Sheet

10

S101
Segmenting the plurality of apical 4-chamber (A4C) view images of subjects with or without being diagnosed with HFpEF to produce a plurality of segmented images S102
Extracting a plurality of features from each segmented A4C view images of step S101 to produce a plurality of linear waveforms S103
Training the plurality of linear waveforms of step S102 with the diagnosis of the subjects, thereby establishing the model

10

S101
Segmenting the plurality of apical 4-chamber (A4C) view images of subjects with or without being diagnosed with HFpEF to produce a plurality of segmented images S102
Extracting a plurality of features from each segmented A4C view images of step S101 to produce a plurality of linear waveforms S103
Training the plurality of linear waveforms of step S102 with the diagnosis of the subjects, thereby establishing the model

METHOD FOR IDENTIFYING AND TREATING HEART FAILURE WITH PRESERVED EJECTION FRACTION

BACKGROUND OF THE INVENTION

1. Field of the Invention

The present disclosure relates to the field of diagnosis and treatment of heart failure with preserved ejection fraction (HFpEF). More particularly, the disclosed invention relates to methods for identifying whether a subject has HFpEF with the aid of a model built with apical 4 chamber (A4C) view images, and treating the subject having HFpEF.

2. Description of Related Art

Heart failure (HF) is a significant and growing global public health issue, leading to a high annual rate of hospitalizations, totaling approximately one million cases. HF patients can be classified into two primary phenotypes: those with HF characterized by reduced ejection fraction and those with HF characterized by preserved ejection fraction (HFpEF). Patients with reduced ejection fraction HF have impaired systolic function, whereas HFpEF patients experience diastolic dysfunction. These two phenotypes exhibit distinct clinical and morphometric characteristics, indicating the presence of distinct underlying pathological molecular or biological mechanisms.

HFpEF is progressively becoming the predominant form of heart failure. According to the 2016 guidelines established by the American College of Cardiology and the American Heart Association, along with the diagnostic algorithm of the European Society of Cardiology, crucial diagnostic criteria of HFpEF include an left ventricular ejection fraction (LVEF) $\geq 50\%$, LV mass index $\geq 115$ mL/m$^2$ in men and $\geq 95$ mL/m$^2$ in women, left atrial volume index $\geq 34$ mL/m$^2$, along with functional alterations of lower tissue Doppler-derived myocardial relaxation (e') and elevated left ventricular (LV) passive filling (E/e' ratio), and elevated brain natriuretic peptide (BNP) concentration. To collect these parameters, a medical ultrasound examination and the subsequent analysis of ultrasound results are necessary. However, the accuracy of diagnosing HFpEF heavily hinges on the clinician's expertise, and these ultrasound assessments are usually carried out at a leisurely pace, often when the patient presents symptoms of HF, which leads to delays in proper treatments.

Artificial intelligence (AI) deep learning algorithms have found extensive use in the medical realm, aiding in the diagnostic process. AI-enhanced echocardiographic interpretation can expedite the identification of specific diseases. However, diagnosing diseases like HFpEF, which demand multiangle echocardiography and the measurement of numerous cardiac function parameters, continues to pose a significant challenge.

In view of the foregoing, there exists in the related art a need for an efficient AI-assisted diagnostic pre-screening tool dedicated to HFpEF diagnosis and identification.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

As embodied and broadly described herein, the purpose of the present disclosure is to provide a diagnostic method for identifying heart failure with preserved ejection fraction (HFpEF) via a plurality of apical 4-chamber (A4C) view images. Also disclosed herein is a method for treating the subject identified by the present method.

In one aspect, the present disclosure is directed to a method for building a model for identifying heart failure with preserved ejection fraction (HFpEF) via a plurality of apical 4-chamber (A4C) view images of subjects with or without being diagnosed with HFpEF. The method comprises: (a) segmenting the plurality of A4C view images to produce a plurality of segmented images; (b) extracting a plurality of features from each segmented A4C view images of step (a) to produce a plurality of linear waveforms; and (c) training the plurality of linear waveforms of step (b) with the diagnosis of the subjects, thereby establishing the model. In step (b) of the present method, each of the plurality of features is selected from the group consisting of the length, width, area, and volume of the left ventricle (LV) or the left atrium (LA) on each of the plurality of A4C view images.

According to embodiments of the present disclosure, in step (a) the plurality of A4C view images is segmented by use of U-net.

Alternatively or optionally, before step (a), the present method further comprises normalizing the plurality of A4C view images to produce a plurality of normalized images, wherein each normalized image has 128×128 pixels, and each pixel is normalized between 0 and 1.

According to embodiments of the present disclosure, in step (b), the plurality of features are extracted by use of a convex hull algorithm.

According to embodiments of the present disclosure, in step (c), the plurality of linear waveforms is trained by use of a one-dimensional convolutional neural network (CNN). In working embodiments of the present disclosure, in step (c) of the present method, each linear waveform is further cropped to 60 frames.

In another aspect, the present disclosure pertains to a method for identifying and treating heart failure with preserved ejection fraction (HFpEF) based on an apical 4 chamber (A4C) view image of a subject. The method comprises (a) segmenting the A4C view image to produce a segmented image; (b) extracting a plurality of features from the segmented image of step (b) to produce a plurality of linear waveforms; and (c) identifying the subject has HFpEF by processing the plurality of linear waveforms independently produced in step (b) with the aid of the model established by the afore-mentioned present method; and (d) providing a medicament to the subject having HFpEF identified in step (c). In this method, each feature of step (b) is selected from the group consisting of the length, width, area, and volume of the left ventricle (LV) or the left atrium (LA) on the A4C view image of the subject.

According to embodiments of the present disclosure, in step (a), the A4C view image is segmented by use of U-net.

According to embodiments of the present disclosure, before step (a), the present method further comprises normalizing the A4C view image to produce a normalized image, wherein the normalized image has 128×128 pixels, and each pixel is normalized between 0 and 1.

According to embodiments of the present disclosure, in step (b), the plurality of features are extracted by a convex hull algorithm.

According to embodiments of the present disclosure, in step (c), the plurality of linear waveforms is trained by use of a one-dimensional convolutional neural network (CNN). In preferred embodiments, in step (c), each linear waveform is further cropped to 60 frames.

According to embodiments of the present disclosure, in step (d), the medicament is selected from the group consisting of an angiotensin-converting-enzyme (ACE) inhibitor, an angiotensin receptor blocker (ARB), a beta-blocker, a calcium channel blocker, an aldosterone antagonist and a diuretic.

By virtue of the above configuration, the method for identifying HFpEF of a subject based on apical 4 chamber (A4C) view images can be executed in a rapid manner, thereby improving the efficiency and accuracy in diagnosis and treatment of HFpEF.

Many of the attendant features and advantages of the present disclosure will becomes better understood with reference to the following detailed description considered in connection with the accompanying drawings.

BRIEF DESCRIPTION OF THE DRAWINGS

The present description will be better understood from the following detailed description read in light of the accompanying drawings, where:

The sole FIGURE is a flow chart of a method 10 according to one embodiment of the present disclosure In accordance with common practice, the various described features/elements are not drawn to scale but instead are drawn to best illustrate specific features/elements relevant to the present invention. Also, like reference numerals and designations in the various drawings are used to indicate like elements/parts.

DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

1. Definition

For convenience, certain terms employed in the specification, examples and appended claims are collected here. Unless defined otherwise, all technical and scientific terms used herein have the same meaning as commonly understood by one of the ordinary skill in the art to which this invention belongs.

The singular forms "a", "and", and "the" are used herein to include plural referents unless the context clearly dictates otherwise.

The term "feature" as used herein refers to designated echocardiographic information directly obtained or extracted from apical 4-chamber (A4C) view images of subject(s). According to embodiments of the present disclosure, the extractable features from a single A4C view image include, but are not limited to, the chamber length, the width, the area, and the volume of right ventricle (RV), right atrium (RA), left ventricle (LV), or left atrium (LA); interventricular septum; LV internal diameter in diastole; end-diastolic volume; end-systolic volume; deceleration time (ms); left ventricular ejection fraction (LVEF); left atrial volume index (LAVI); average Doppler-derived myocardial relaxation (e'); ratio of mitral peak E velocity to average e' (E/e'); and tricuspid regurgitation velocity (TRV).

The term "intrabeat dynamics" as used herein refers to dynamic changes or variations that occur within a heartbeat or a single cardiac cycle. In echocardiography, intrabeat dynamics refers to the changes in parameters or features within one heartbeat, which can provide valuable information about cardiac function and health. For example, the changes in the size of the left ventricle (LV) or the movement of heart valves during a single heartbeat are aspects of intrabeat dynamics that can be examined to assess cardiac conditions. According to embodiments of the present disclosure, intrabeat dynamics include the parameters of the length, width, area, and volume of the left ventricle (LV) or the left atrium (LA).

As used herein, the terms "treat," "treating" and "treatment" are interchangeably used, and intends to mean partially or completely preventing, ameliorating, mitigating and/or managing a symptom, a secondary disorder or a condition associated with HFpEF.

2. Description of the Invention

The main objective of the present application is to develop an AI-assisted screening method and model capable of automatically extracting prominent intrabeat dynamic patterns associated with HFpEF from apical 4-chamber (A4C) view images, so as to timely identify subjects having HFpEF and provide treatment thereto.

2.1 Method for Building a Model for the Identification of HFpEF

The first aspect of the present disclosure is directed to a method for building a model for identifying heart failure with preserved ejection fraction (HFpEF). Reference is made to the sole FIGURE.

The sole FIGURE is a flow chart of a method 10 implemented on a computer according to one embodiment of the present disclosure. The method 10 includes the following steps (see the reference numbers S101 to S103 indicated in the sole FIGURE), S101: segmenting a plurality of A4C view images of subjects with or without being diagnosed with HFpEF to produce a plurality of segmented images;

S102: extracting a plurality of features from each segmented A4C view images of step S101 to produce a plurality of linear waveforms; and S103: training the plurality of linear waveforms of step S102 with the diagnosis of the subjects, thereby establishing the model.

The apical 4-chamber (A4C) view images used in the present method 10 are generally obtained during an echocardiogram, in which the heart's structures and function are visualized with the aid of ultrasound. According to embodiments of the present disclosure, a collection of A4C view images are first amassed from the echocardiographic records of numerous subjects with and without being diagnosed with HFpEF. The medical records of these subjects were obtained under informed consent. According to embodiments of the present disclosure, the subjects are categorized into two groups: the HFpEF group and the control group, based on their diagnostic records, and the A4C view images of subjects within each group are subsequently analyzed by the present method 10. It should be noted that additional or optional criteria may be applied for the purpose of grouping;

such criteria include factors like age, the presence of heart failure (HF) symptoms, levels of natriuretic peptide (NT-pro BNP and/or BNP), and the subjects' history of heart failure, etc. In one working example, the subjects whom are older than 20 years of age, having normal levels of BNP/NT-proBNP (i.e., BNP≥100 μg/mL or NT-proBNP≥300 μg/mL), not exhibiting symptoms of HF, nor possessing a history of HF, are categorized as the control group.

In step S101 of the present method 10, the plurality of A4C view images is first subject to image segmentation. According to embodiments of the present disclosure, a convolutional neural network with a U-shaped architecture (U-net) consisting of a contracting and an expanding pathway focused on image features is used to capture the edge of a target area on the input images, and then to output segmented images. In some working examples, the edges of the left atrial and LV chambers on the segment images were obtained by use of U-net of which depth applied thereto is 4 layers for down-convolution and 4 layers for up-convolution. According to alternative or optional embodiments, the plurality of A4C view images are processed and normalized to produce a plurality of normalized images before being subject to image segmentation. In working examples, the A4C view images collected from medical databases are cropped and resized to certain pixel sizes, such as 64×64, 128×128, or 256×256. Preferably, the plurality of A4C view images is resized in 128×128 pixels. Then, each pixels of each resized images is further normalized between 0 and 1 by algorithms well known in the art, so as to standardize the pixel values within the image input into U-net architecture for training the model.

After image segmentation, the plurality of features of each segmented A4C view images is extracted, thereby producing a plurality of linear waveforms (step S102). According to embodiments of the present disclosure, each feature is selected from the group consisting of the length, width, area, and volume of the left ventricle (LV) or the left atrium (LA). The extraction may be achieved by use of various well-known algorithms and techniques. In some working examples of the present disclosure, the length, width, area, and volume of the LV and LA are extracted and calculated by a convex hull algorithm to find the smallest square around the edges of each chamber, thereby transferring and producing at least four types of linear waveforms for each A4C view images. In alternative examples, eight linear waveforms (e.g., LV length, LV width, LV area, LV volume, LA length, LA width, LA area, and LA volume) may be extracted from each A4C view images.

In step S103 of the present method, the change of length, width, area, and volume in LA or LV during the systolic-diastolic cycle may severe as linear signals to be trained and classified by one-dimensional convolutional neural network (1D CNN). According to embodiments of the present disclosure, before being imported into 1D CNN model, each linear waveform is cropped to 40 to 80 frames in accordance with practical needs, such as 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 frames. In one working example, each linear waveform is cropped to 60 frames, such that at least one complete systolic-diastolic cycle is included in the linear waveform diagram. The convolutional and pooling layers of the 1D CNN model used in the present method are set according to practical needs based on the linear waveforms produced in step S102, to concrete the feature imported into the 1D CNN model and output the trained model. In one working example, the network structure of the present 1D CNN consists of 4 convolutional layers, 2 pooling layers, 2 dropout layers, and 1 dense layer, thereby establishing the present model capable of identifying subjects having HFpEF based on the A4C view images of subjects pre-diagnosed with or without HFpEF.

By performing the afore-mentioned steps S101 to S103, a model well-trained for identifying HFpEF based on A4C view images from a subject is established.

2.2 Methods for Identifying and Treating HFpEF

The present disclosure also aims at providing treatment to a subject having been identified as having HFpEF. To this purpose, the afore-described method and model may assist clinicians in making a precise identification based on an apical 4-chamber (A4C) view image of the subject, so that the subject identified to be having HFpEF may be timely treated (e.g., via administering a medicament). The present disclosure thus encompasses a method for identifying and treating HFpEF of a subject identified by the afore-described model.

According to some embodiments of the present disclosure, the method comprises,
(a) segmenting the A4C view image to produce a segmented image;
(b) extracting a plurality of features from the segmented image of step (b) to produce a plurality of linear waveforms;
(c) identifying the subject has HFpEF by processing the plurality of linear waveforms independently produced in step (b) with the aid of the model established by the present method; and
(d) providing a medicament to the subject having HFpEF identified in step (c).

The present method commences from obtaining an A4C view image of a subject during echocardiographic assessments. Once the A4C view image is obtained, it is processed in a manner similar to steps S101 to S102 of the method 10 described in section 2.1 of this paper, including segmentation, feature extraction, and creation of linear waveforms. According to embodiments of the present disclosure, the processed linear waveform is then fed into the model established by the present method 10 as described in section 2.1, to determine whether the subject's A4C view image corresponds to symptoms of HFpEF.

Once the subject having HFpEF is identified, appropriate treatments (e.g., medicaments) could then be initiated to ameliorate the conditions and symptoms associated with HFpEF. Examples of the medicament suitable for use in the present method (i.e., for administering to a subject having HFpEF) include, but are not limited to, an angiotensin-converting-enzyme (ACE) inhibitor, an angiotensin receptor blocker (ARB), a beta-blocker, a calcium channel blocker, an aldosterone antagonist, a diuretic, and a combination thereof. Any clinical artisans may choose a suitable treatment for use in the present method based on factors such as the particular condition being treated, the severity of the condition, the individual patient parameters (including age, physical condition, size, gender and weight), the duration of the treatment, the nature of concurrent therapy (if any), the specific route of administration and like factors within the knowledge and expertise of the health practitioner.

By the virtue of the above features, the present method can provide precise identification of HFpEF mainly based on intrabeat dynamics extracted from A4C view images, thereby improving accuracy and efficiency of HFpEF diagnosis and allowing the identified patients to be treated properly.

EXAMPLES

Material and Methods

Study Design

A data set of 2,304 participants and their apical 4-chamber (A4C) view images were obtained under informed consent and were used in the present study. The intrabeat dynamics of the geometric measures were extracted frame by frame from the A4C image sequenced to train and establish the present model. An external testing data set of a total of 465 participants (including 315 patients with HFpEF across different hospitals) were used to validate the present model. Accuracy, sensitivity, specificity, F1 score, and receiver-operating characteristic (ROC) curves were used to evaluate the prescreening outcome of the present model.

symptoms or signs that met the Framingham criteria and required intravenous diuretic therapy. The diagnostic criteria for HFpEF also encompassed elevated natriuretic peptide levels (BNP ≥100 μg/mL or N-terminal pro-BNP ≥300 μg/mL). All 1,263 subjects of the control group exhibited normal LVEFs exceeding 50%. Comprehensive angle views obtained through echocardiography were present in the Digital Imaging and Communications in Medicine (DICOM) files for all participants. The patient cohort involved in the present study was enrolled between January 2011 and December 2013, with the approval of the Mackay Memorial Hospital Institute Research Medical Ethics Committee (18MMHIS127e). The characteristics of the population for training models are summarized in Table 1.

TABLE 1

Characteristics of the population for training the present model

|  | HFpEF Group | Control Group |
| --- | --- | --- |
| Physical information | | |
| Individual amount | 1,041 | 1,263 |
| Age (yrs) | 72 ± 14 | 47 ± 9 |
| Male | 489 | 346 |
| Female | 554 | 917 |
| BMI (kg/m$^2$) | 25 ± 5 | 24 ± 3 |
| Systolic blood pressure (mm Hg) | 149 ± 28 | 124 ± 16 |
| Heart rates (beats/min) | 80 ± 20 | 73 ± 10 |
| NT-proBNP (pg/mL) | 787 (290.3-1,780.0) | 27.4 (11.7-49.9) |
| Total cholesterol (mg/dL) | 170.72 ± 49.82 | 201.68 ± 34.37 |
| High density lipoprotein cholesterol (mg/dL) | 45.08 ± 13.71 | 53.52 ± 14.57 |
| eGFR (mL/min/1.73 m$^2$) | 47.40 ± 35.32 | 87.42 ± 15.81 |
| Hypertension | 706 | 0 |
| Diabetes | 467 | 0 |
| Cardiovascular disease | 477 | 1 |
| Coronary artery disease | 381 | 0 |
| Atrial fibrillation | 327 | 0 |
| Echocardiographic information | | |
| Interventricular septum (mm) | 9.82 ± 1.84 | 9.18 ± 1.32 |
| LV internal diameter in diastole (mm) | 47.01 ± 5.63 | 47.68 ± 3.23 |
| End-diastolic volume (mL) | 102.08 ± 29.95 | 106.48 ± 16.18 |
| End-systolic volume (mL) | 42.18 ± 20.34 | 35.20 ± 7.73 |
| LVEF (%) | 60.24 ± 9.15 | 67.03 ± 4.33 |
| LV mass index (g/m$^2$) | 90.36 ± 27.79 | 77.65 ± 16.45 |
| Deceleration time (ms) | 209.99 ± 74.54 | 199.91 ± 31.66 |
| TRV (m/s) | 3.2 ± 0.5 | 2.1 ± 0.3 |
| Average e' (cm/s) | 6.0 ± 2.3 | 11.7 ± 2.2 |
| E/e' | 16.8 ± 6.6 | 6.1 ± 1.6 |
| LAVI (mL/m$^2$) | 34.1 ± 12.2 | 15.6 ± 5.6 |

Values are n, mean ± SD, or median (interquartile range).

***BMI = body mass index; E/e' = ratio of mitral peak E velocity to average e'; eGFR = estimated glomerular filtration rate; HFpEF = heart failure with preserved ejection fraction; LAVI = left atrial volume index; LV = left ventricular; LVEF = left ventricular ejection fraction; NT-proBNP = N-terminal pro-brain natriuretic peptide; TRV = tricuspid regurgitation velocity.

Dataset Selection

I. Internal Dataset

The internal dataset consisted of a total of 2,304 participants, with 1,263 asymptomatic individuals recruited from cardiovascular health surveys were classified as the control group, and 1,041 patients aged over 20 years diagnosed with HFpEF were designated as the HFpEF group. The diagnosis of HFpEF primarily relied on a patient's history of HF-related admissions within the past 12 months, manifesting II. External Dataset The external dataset of 315 HFpEF patients across different hospitals were collected and served for a validation purpose to assess the efficacy of the present model. To provide a comparative baseline, 150 patients with chronic obstructive pulmonary disease (COPD) lacking HFpEF symptoms were designated as the control group, as the outward manifestations of COPD resembled those of HFpEF. The characteristics of the external population are summarized in Table 2.

TABLE 2

Characteristics of the study population for verifying the present model

| | External HFpEF Group | External COPD control Group |
|---|---|---|
| Physical information | | |
| Individual amount | 315 | 150 |
| Age (yrs) | 70 ± 13 | 55.03 ± 13.43 |
| Male | 134 | 131 |
| Female | 181 | 17 |
| BMI (kg/m$^2$) | 25 ± 5 | 71.19 ± 12.44 |
| Systolic blood pressure (mm Hg) | 152 ± 27 | 130.24 ± 19.70 |
| Heart rates (beats/min) | 84 ± 23 | 70 ± 10.8 |
| NYHA functional class | | |
| I | 13 | — |
| II | 190 | — |
| III and IV | 112 | — |
| Cardiomegaly | 167 | 16 |
| Jugular vein engorgement | 76 | 12 |
| Peripheral oedema | 192 | 5 |
| NT-proBNP (pg/mL) | 796 (399.50-2,000.00) | 33.70 (16.00-93.42) |
| Total cholesterol (mg/dL) | 177 ± 55 | 224.94 ± 34.48 |
| High density lipoprotein cholesterol (mg/dL) | 45.56 ± 13.82 | 47.2 ± 10.7 |
| eGFR (mL/min/1.73 m$^2$) | 49.47 ± 31.73 | 67.5 ± 24.2 |
| Hypertension | 162 | 48 |
| Diabetes | 160 | 35 |
| Coronary artery disease | 137 | 29 |
| Atrial fibrillation | 105 | 6 |
| Echocardiographic information | | |
| Interventricular septum (mm) | 10.72 ± 2.26 | 9.56 ± 1.48 |
| LV posterior wall thickness (mm) | 10.53 ± 1.83 | 9.58 ± 1.51 |
| LV internal diameter in diastole (mm) | 48.43 ± 6.38 | 50.60 ± 38.05 |
| End-diastolic volume (mL) | 112.53 ± 35.10 | 106.37 ± 20.12 |
| End-systolic volume (mL) | 48.90 ± 27.24 | 37.20 ± 8.90 |
| LVEF (%) | 56.90 ± 13.51 | 65.12 ± 5.41 |
| LV mass index (g/m$^2$) | 96.91 ± 30.44 | 82.65 ± 22.20 |
| Deceleration time (ms) | 207.69 ± 67.38 | 207.02 = 48.36 |
| TRV (m/s) | 3.2 ± 0.5 | 2.4 ± 0.3 |
| Average e' (cm/s) | 5.9 ± 1.8 | 10.0 ± 1.9 |
| E/e' | 16.9 ± 6.8 | 7.2 ± 2.0 |
| LAVI (mL/m$^2$) | 36.6 ± 12.4 | 21.7 ± 5.3 |

Values are n, mean ± SD, or median (interquartile range).
NYHA = New York Heart Association; other abbreviations as Table 1.

Model Construction

All A4C view frames of the participants were extracted from Digital Imaging and Communications in Medicine (DICOM) files and converted into images, which were then cropped and resized to dimensions of 128×128 pixels. Each pixel's values were subsequently normalized to a range of 0 to 1 for neural network training and prediction. The U-net, a conventional neural network with a U-shaped architecture designed for image feature processing, was employed to extract the edges of the left atrial and left ventricular chambers. In the present disclosure, a U-net with a depth of 4 layers for down-convolution and another 4 layers for up-convolution was utilized. After U-net segmentation, intrabeat dynamics including length, width, area, and volume of the LV and/or LA regions were obtained and calculated by using a convex hull algorithm, which defined the smallest square encompassing the chamber's edge. All these parameters from each frame were recorded as linear data for subsequent 1-dimensional (1D) Convolutional Neural Network (CNN) processing. The maximum and minimum areas of the left atrium and left ventricle were utilized to identify diastolic and systolic views, which in turn allowing the volumes of left atrial and LV, and derived LVEF can be calculated. These calculations were based on recommended guidelines for cardiac chamber quantification by echocardiography.

The dynamic variations in LA and LV length, width, area, and volume within each cardiac cycle (i.e., intrabeat dynamics) were recorded as four distinct types of linear waveform signals, poised for further classification through the utilization of a 1D CNN. The network structure consisted of 4 convolutional layers, 2 pooling layers, 2 dropout layers, and 1 dense layer. The convolutional and pooling layers were used to concentrate the linear features. The dropout layers were designed to randomly drop some connections between layers to prevent overfitting, and the dense layer was designed for output. These 4 types of linear signals were cropped to 60 frames constituting at least 1 complete systolic-diastolic cycle, and were then separately imported and trained within the four identical 1D CNN, so as to establish the present model for HFpEF prediction.

Model Validation

The 10% of the total 2,304 participants (i.e., n=232) randomly selected during the training process were served as an internal testing dataset for further validation. In addition, an independent external data set with 315 patients with HFpEF and 150 symptomatic patients with COPD from another hospital branch were also used to verify the accuracy of the present model. These patients with COPD (confirmed by spirometry) showed normal LVEFs (>50%)

and low natriuretic peptide levels (N-terminal pro-BNP <125 μg/mL or BNP <35 μg/mL) without prior HF diagnosis or HF hospitalization.

Statistical Analysis

For evaluation of the 1D CNN model, accuracy, sensitivity, specificity, F1 score, and a ROC curve that commonly applied in the evaluation of deep-learning models were used. Cohen's kappa coefficient (K) was used to calculate the error between the model predicted label and manual echocardiographic label. The kappa score was used to evaluate the expert-calculated LVEF and the AI-derived LVEF to measure the inter-rater consistency between the expert and the present model. In addition, the kappa score was also used to evaluate the HFpEF prediction results between the expert and the AI model.

Example 1 Constructing and Evaluation of HFpEF Identification Model of the Present Disclosure 1.1 Constructing HFpEF Identification Model This experiment aimed at providing a model trained for HFpEF identification. To this purpose, a total of 2,304 A4C view images, which included 1,263 asymptomatic individuals and 1,041 subjects having HFpEF, were used to extract and produce four types of linear waveforms (including length, width, area, and volume of LA and LV), and four models for HFpEF identification were respectively trained and established by receiving each linear waveforms in accordance with the procedures set forth in "Materials and methods" section.

1.2 Evaluation of the HFpEF Identification Model of Example 1.1

The efficiency of the trained model for HFpEF identification of Example 1.1 was verified. To this purpose, the internal testing dataset (i.e., n=232) were randomly selected and input into the present model to validate its predication accuracy; and an additional external dataset of 465 subjects were also processed and input into the present model (i.e., the HFpEF identification model set forth above) for further validation. Validated results are respectively summarized in Tables 3 and 4.

TABLE 3

HFpEF identification results by importing the internal testing dataset (n = 232)

| | 1D CNN Prediction Result | | | | | |
|---|---|---|---|---|---|---|
| | Accuracy | Sensitivity | Specificity | F1 Score | κ | AUC (95% CI) |
| Left atrium | | | | | | |
| Length | 0.81 | 0.92 | 0.69 | 0.83 | 0.61 | 0.89 (0.85-0.93) |
| Width | 0.83 | 0.89 | 0.77 | 0.84 | 0.65 | 0.90 (0.86-0.94) |
| Area | 0.91 | 0.96 | 0.85 | 0.91 | 0.81 | 0.95 (0.92-0.97) |
| Volume | 0.89 | 0.94 | 0.84 | 0.89 | 0.78 | 0.94 (0.91-0.97) |
| Left ventricle | | | | | | |
| Length | 0.78 | 0.9 | 0.67 | 0.81 | 0.56 | 0.88 (0.83-0.92) |
| Width | 0.81 | 0.81 | 0.80 | 0.81 | 0.61 | 0.87 (0.82-0.91) |
| Area | 0.88 | 0.91 | 0.85 | 0.88 | 0.75 | 0.95 (0.92-0.97) |
| Volume | 0.80 | 0.82 | 0.78 | 0.85 | 0.68 | 0.94 (0.91-0.97) |

TABLE 4

HFpEF identification results by importing the external testing dataset (n = 465)

| | 1D CNN Prediction Result | | | | | |
|---|---|---|---|---|---|---|
| | Accuracy | Sensitivity | Specificity | F1 Score | κ | AUC (95% CI) |
| Left atrium | | | | | | |
| Length | 0.80 | 0.75 | 0.83 | 0.71 | 0.57 | 0.87 (0.84-0.89) |
| Width | 0.77 | 0.66 | 0.82 | 0.64 | 0.47 | 0.85 (0.82-0.88) |
| Area | 0.85 | 0.83 | 0.85 | 0.77 | 0.66 | 0.92 (0.90-0.94) |
| Volume | 0.86 | 0.85 | 0.86 | 0.79 | 0.69 | 0.93 (0.90-0.95) |
| Left ventricle | | | | | | |
| Length | 0.77 | 0.86 | 0.73 | 0.71 | 0.53 | 0.85 (0.82-0.88) |
| Width | 0.84 | 0.71 | 0.90 | 0.74 | 0.62 | 0.87 (0.84-0.90) |
| Area | 0.87 | 0.84 | 0.88 | 0.80 | 0.70 | 0.93 (0.91-0.95) |
| Volume | 0.85 | 0.79 | 0.89 | 0.78 | 0.67 | 0.95 (0.88-0.93) |

The results in Table 3 revealed that the present model was highly accurate in identifying patients with HFpEF from control subjects. Among all dynamic information, both area changes of LA and LV were best indicatives (AUC: 0.95) in distinguishing patients with HFpEF from control subjects. Specifically, within the features of LA, the left atrial area model exhibited the highest prediction accuracy, with accuracy, sensitivity, specificity, F1 score, and kappa score being 0.91 0.96, 0.85, 0.91, and 0.81, respectively. Similarly, the LV area model exhibited the highest prediction accuracy among the LV models, with accuracy, sensitivity, specificity, F1 score, and kappa score being 0.88, 0.91, 0.85, 0.88, and 0.75, respectively.

The results of validation through the external testing dataset were consist with that of the present model of Example 1.1. As shown in Table 4, the linear waveforms of both LA and LV area exhibited higher accuracy as compared to that of other parameters in predicting HFpEF. Further, since the external dataset comprised non-HFpEF subjects with symptom of COPD, who were distinct from asymptomatic individuals in the internal dataset, the model could also effectively identify COPD from HFpEF individuals via intrabeat dynamics presented on A4C view images.

Taken together, the present model can differentiate abnormal diastolic indexes in a subject. Thus, the AI-assisted model developed in the present disclosure with the aid of intrabeat dynamics, is a rapid, time-saving, and accurate prescreening platform to facilitate HFpEF diagnosis. Also provided by the present approach is a method to automatically generate valuable quantitative metrics that may assist clinicians in making a diagnosis of HFpEF.

It will be understood that the above description of embodiments is given by way of example only and that various modifications may be made by those with ordinary skill in the art. The above specification, examples, and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A method for building a model for identifying heart failure with preserved ejection fraction (HFpEF) via a plurality of apical 4-chamber (A4C) view images of subjects with or without being diagnosed with HFpEF, consisting of:
    (a) segmenting the plurality of A4C view images to produce a plurality of segmented images;
    (b) extracting a plurality of features from each segmented A4C view images of step (a) to produce a plurality of linear waveforms; and
    (c) training the plurality of linear waveforms of step (b) with the diagnosis of the subjects, thereby establishing the model;
    wherein each feature of step (b) is selected from the group consisting of the length, width, area, and volume of the left ventricle (LV) or the left atrium (LA) on each of the plurality of A4C view images.

2. The method of claim 1, wherein in step (a), the plurality of A4C view images is segmented by U-net.

3. The method of claim 1, wherein in step (b), the plurality of features is extracted by a convex hull algorithm.

4. The method of claim 1, wherein in step (c), the plurality of linear waveforms is trained by use of a one-dimensional convolutional neural network (CNN).

5. The method of claim 4, wherein each linear waveform is cropped to 60 frames.

6. A method for identifying and treating heart failure with preserved ejection fraction (HFpEF) based on an apical 4-chamber (A4C) view image of a subject, consisting of:
    (a) segmenting the A4C view image to produce a segmented image;
    (b) extracting a plurality of features from the segmented image of step (b) to produce a plurality of linear waveforms;
    (c) identifying the subject has HFpEF by processing the plurality of linear waveforms independently produced in step (b) with the aid of the model established by claim 1; and
    (d) providing a medicament to the subject having HFpEF identified in step (c),
        wherein, each feature of step (b) is selected from the group consisting of the length, width, area, and volume of the left ventricle (LV) or the left atrium (LA) on the A4C view image of the subject.

7. The method of claim 6, wherein in step (a), the plurality of A4C view images is segmented by U-net.

8. The method of claim 6, wherein in step (b), the plurality of features is extracted by a convex hull algorithm.

9. The method of claim 6, wherein in step (c), the plurality of linear waveforms is trained by a one-dimensional convolutional neural network (CNN).

10. The method of claim 9, wherein each linear waveform is cropped to 60 frames.

11. The method of claim 6, wherein in step (d), the medicament is selected from the group consisting of an angiotensin-converting-enzyme (ACE) inhibitor, an angiotensin receptor blocker (ARB), a beta-blocker, a calcium channel blocker, an aldosterone antagonist, and a diuretic.

* * * * *